Oct. 17, 1933. W. F. EAMES 1,930,513
ELEVATOR CONTROL SYSTEM
Filed Dec. 20, 1929 2 Sheets-Sheet 2
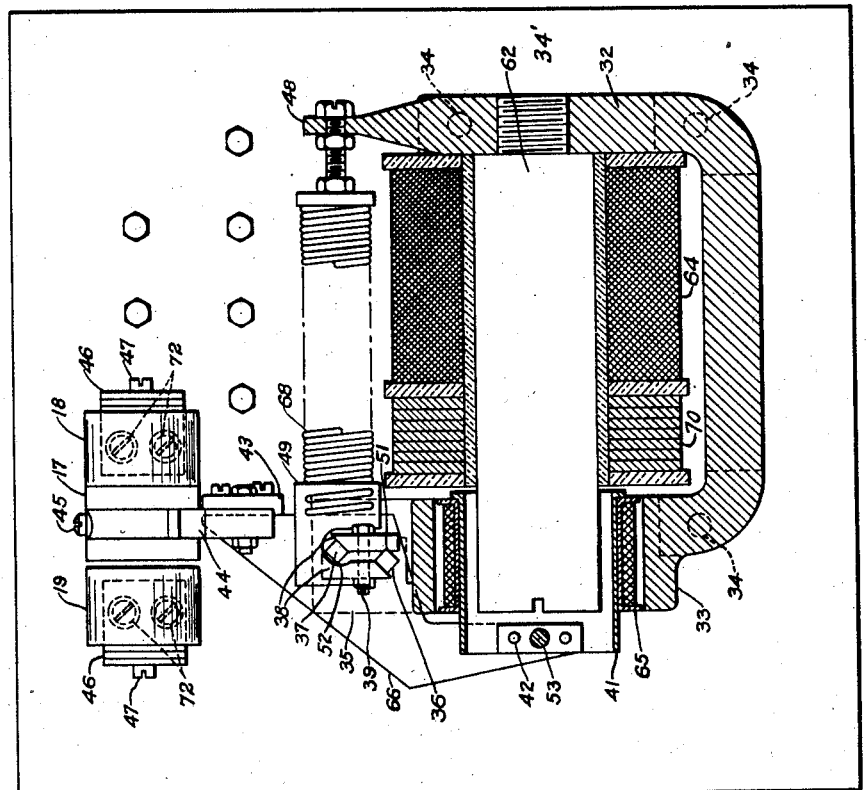
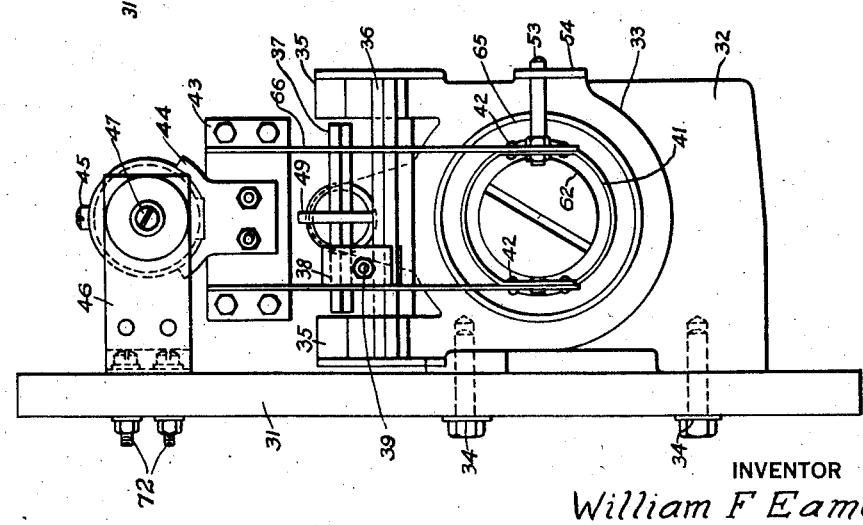
INVENTOR
William F Eames
BY
ATTORNEY Patented Oct. 17, 1933

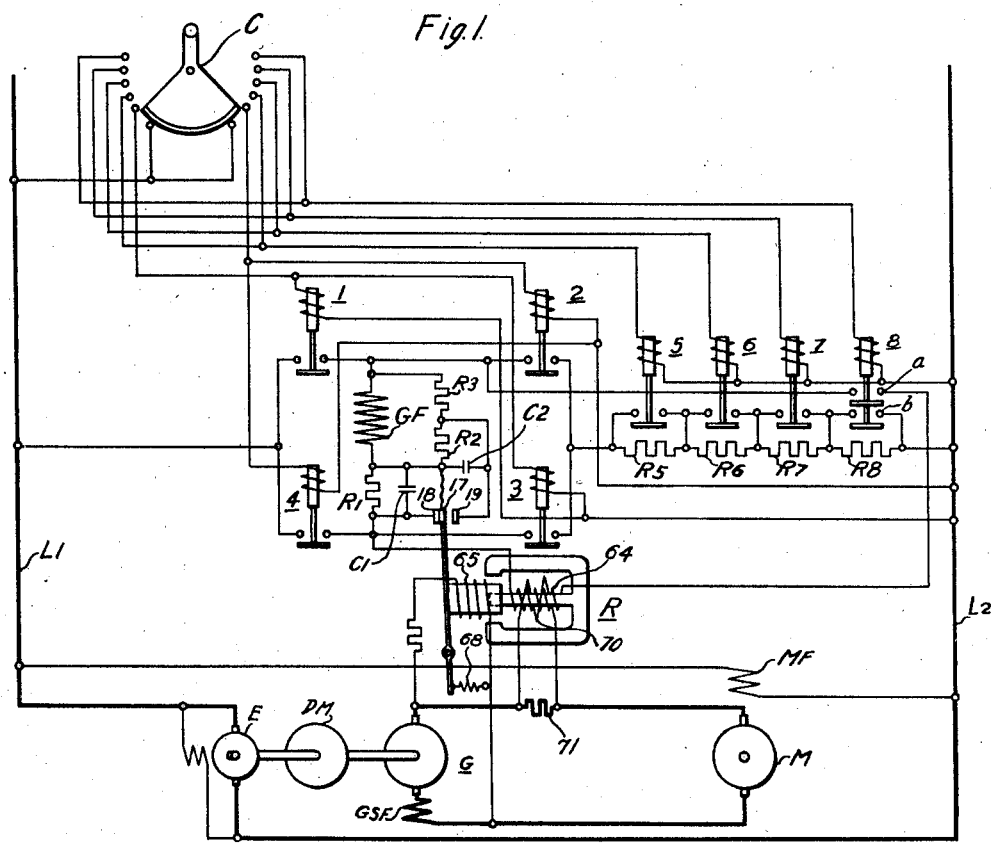

1,930,513

UNITED STATES PATENT OFFICE 1,930,513

ELEVATOR CONTROL SYSTEM

William F. Eames, Edgewood, Pa., assignor to Westinghouse Electric & Manufacturing Company, a corporation of Pennsylvania Application December 20, 1929
Serial No. 415,483

3 Claims. (Cl. 172—239)

My invention relates to motor-control systems and it has particular relation to variable-voltage systems in which the speed of a direct-current motor is controlled by varying the voltage supplied to it from a separately excited generator. In such systems, the speed of the motor may be controlled by adjustment of the generator excitation; there being a particular motor speed for each value of generator excitation.

However, when the generator excitation is adjusted to obtain a particular motor speed at no load, the motor does not maintain this speed when loaded but operates at speeds somewhat below it for motoring loads and at speeds somewhat above it for overhauling loads. For many purposes, this variation of speed with the load is not objectionable but, in some applications, notably elevators, hoists and similar apparatus, it is desirable to maintain the motor speed constant, regardless of the load.

Attempts have been made to compensate for speed variations due to load by means of a series cumulative winding on the generator and such attempts have met with considerable success. However, I have found that such means is not entirely satisfactory for this purpose since, if the series winding is given the correct number of turns to compensate for the speed variation of the motor in the low-speed range, it will not properly compensate for speed variation in the high-speed range, because of the fact that the generator magnetic circuit is more nearly saturated when the generator separately excited field is adjusted for high-speed motor operation. On the other hand, if the series winding is given a sufficient number of turns to compensate for speed variations of the motor in the high-speed range, the effect of the series winding will be too great in the low-speed range, causing the motor speed to rise with increase of load, resulting in unstable operation and undesirable fluctuations of motor speed.

It is, accordingly, an object of my invention to so supplement the generator series cumulative field winding of a variable-voltage system by providing a speed-regulating means for the motor of the system that satisfactory operation of the motor may be had at all operating speeds.

According to my invention, I provide the generator with a series cumulative field winding of a sufficient number of turns to compensate for speed variations due to load in the low and intermediate-speed ranges, and supplement the action of the series field in the high-speed range by means of a vibrating relay for the generator separately-excited field that will respond to the current in the motor-generator loop circuit to increase the generator excitation with motoring loads and to decrease it with overhauling loads so that the motor speed is held approximately constant, regardless of the value or direction of the current in the loop circuit.

While various devices may be used in the practice of my invention, I prefer to use a relay of the moving-coil type, such as is shown and described in Patent # 1,820,712, granted to Walter Schaelchlin on August 25, 1931 and assigned to the Westinghouse Electric and Mfg. Company.

The novel features which I consider characteristic of my invention are set forth with particularity in the appended claims. The invention itself, however, both as to its organization and its method of operation, together with additional objects and advantages thereof, will best be understood from the following description of specific embodiments, when read in connection with the accompanying drawings, in which:

Fig. 1 is a diagrammatic view of a system of control organized in accordance with the present invention.

Fig. 2 is a diagrammatic view of a modification of the system shown in Fig. 1.

Fig. 3 is an end elevational view of the relay which I prefer to use in the practice of my invention.

Fig. 4 is a view, partly in section and partly in side elevation, of the relay shown in Fig. 3.

Referring to the drawings, Fig. 1 shows a direct-current motor M for driving a load, having its armature connected in a loop circuit with the armature of a variable-voltage generator G. The motor M is provided with a separably excited field winding MF connected across the supply lines L1 and L2. The generator G is provided with a separately excited field winding GF connected in series with a resistor R1 and in parallel with a circuit comprising a pair of resistors R2 and R3 in series. The whole circuit of GF, R1, R2 and R3 is connected across the supply lines L1 and L2 in series with a set of resistors R5, R6, R7 and R8 by means of either of two sets of reversing switches 1—3 or 2—4. Resistors R5, R6, R7 and R8 are arranged to be short circuited by speed relays 5, 6, 7 and 8, respectively. Reversing switches 1, 2, 3, 4 and speed relays 5, 6, 7 and 8 are controlled by a manually operated controller C, in well known manner, so that either set of reversing switches may be closed and each of the speed relays 5, 6, 7 and 8 operated thereafter in sequence by movement of the handle of manually operated controller C.

A cumulative series winding GSF is provided for the generator G.

The generator G is driven by any suitable means, such as a motor DM.

The supply lines L1 and L2 are energized from any suitable direct-current source, such as exciter E mounted on the same shaft as the generator G.

A relay R of the moving-coil type, to be hereinafter more fully described, is employed to short circuit resistor R1 in one position by means of stationary contact member 18 and moving contact 17 or to short circuit resistor R2 in another position by means of stationary contact 19 and moving contact 17. The relay R is biased, by means of a spring 68, to a position to close contact members 17 and 18. The space between contact members 18 and 19 is sufficient for the relay armature to assume a neutral position in which neither resistor R1 nor resistor R2 is short circuited. A pair of condensers C1 and C2 are connected across the contact members 17, 18 and 17, 19, respectively, to prevent sparking at the contacts.

The relay R is provided with a moving coil 65 connected across the generator armature, a stationary voltage coil 64 to be connected across the generator separately excited field winding when the high-speed relay 8 is closed and a stationary series coil 70 having a shunt 71 in parallel therewith, the circuit of 70 and 71 being connected in series with the armatures of motor M and generator G.

It will be noted that, when the voltage coil 64 is connected across the generator separately excited field winding, it is subject to full line voltage, as all the resistors R5, R6, R7 and R8 are short circuited at this time. I connect the coil 64 in the manner shown rather than directly across the line in order to reverse the polarity of the coil when the generator voltage is reversed.

Fig. 2 shows a modification of the system shown in Fig. 1, in which the coils 64 and 65 are connected in series across the generator G. With this arrangement, the contacts $a$ of speed relay 8 are omitted, the system being otherwise the same as that shown in Fig. 1.

Figs. 3 and 4 of the drawings show, in detail, the form of relay which I prefer to use. The relay is mounted upon a switchboard panel 31, with the axes of coils 64, 65 and 70 disposed horizontally. The magnetic structure comprises a shell 32 having an annular end portion 33 and a cylindrical core 62. The shell portion 32 is attached to the panelboard 31 by any suitable means, such as screws 34, and the core member may be secured to the shell member by any suitable means such as threaded stud 34'.

The annular portion of the magnetic structure 33 is provided with upwardly extending bracket portions 35 upon which the bifurcated arm 66 is supported by means of the square bar 36 extending through the vanes thereof. A similar square bar 37, by means of which the arm 66 may be actuated, also extends through the vanes of the arm 66. The bars 36 and 37 are held in their illustrated positions by means of the clamping members 38 which are held together by a bolt 39.

The moving coil 65 is mounted upon a metal sleeve 41 which extends toward the left and acts as a means for conducting heat from the coil. The sleeve 41 is flattened at portions of its circumference and is attached to the vanes of the arm 66 by any suitable means, such as rivets 42. The vanes of the arm 66 are connected, at their upper ends, by means of a transverse member 43 to which a bracket 44 is attached for carrying the contact members 17, which may be fastened thereto by means of a screw 45 extending therethrough. The stationary contact members 18 and 19 are supported on brackets 46 by screws 47, the brackets being attached to the panel by means of screws 72.

The spring 68 is attached, at its right end, to a bracket extension 48 which may be part of the magnetic structure. The left end of the spring 68 is attached to a flat hook 49 which engages the bar 37 to actuate the arm 66 toward the right, thereby normally maintaining engagement of the contact members 17 and 18.

It will be noted that the position of the bars 36 and 37 is such that the right side of the bar 36, that is, the point 51, which forms the fulcrum point about which the arm 66 rotates, is below and toward the right of the point 52 at the left edge of the bar 37 which is the point of attachment of the hook member 49 carried by spring 68.

As the coil 65 is attracted toward the coils 64 and 70, thus increasing the tension on the spring 68, the point 52 will be moved toward the left and slightly downward, that is, circumferentially about the point 51, thus shortening slightly the lever arm between these points as the tension on the spring increases. The shortening of the lever arm, as the tension on the spring 68 increases, tends to maintain the rotating force constant, irrespective of the position of the coil 65.

The operation of the above-described apparatus may be set forth as follows: upon movement of the handle of controller C (Fig. 1) to the left to the first contact point, a circuit is completed from line L1, through the controller C and the operating coils of reversing switches 2 and 4 in parallel, to line L2. Reversing switches 2 and 4 close to connect the generator separately excited field winding GF to line in series with resistors R5, R6, R7 and R8. The relay R remains in its illustrated position to short circuit resistor R1, as the coils 65 and 70 are inadequate to overcome the force of spring 68, until the coil 64 is energized. The generator G now generates a low voltage, and the motor M begins to operate at a low speed. If the load on the motor is light, the current in the loop circuit is small and the effect of the generator series field winding GSF is correspondingly small. If the load on the motor is heavy, the current is heavy and the generator series field winding GSF so augments the separately excited field winding GF that the generator voltage rises, and the speed of motor M is held constant. If the load is overhauling, the current in the loop circuit is in the opposite direction, and the field produced by the series winding GSF bucks down the field of GF to such value that the motor speed is held constant.

Upon movement of the handle of controller C to the next operating point, a circuit is completed from line L1, through the controller C and the operating coil of speed relay 5, to line L2. Speed relay 5 closes, short circuiting resistor R5. The generator excitation is increased, and the motor speed is increased to a second value which is held constant by the action of the generator series field.

Similarly, movement of the controller handle to the next two operating points consecutively completes the circuits of speed relays 6 and 7, the motor speed being held constant at each controller point by the action of the generator series field.

Movement of the controller handle to the last operating point completes the circuit of speed relay 8. Speed relay 8, in closing, short circuits resistor R8 and, at the same time, connects the coil 64 to the supply lines L1 and L2. The circuit of the coil 64 is as follows: from line L1, through contact members of reversing switch 4, coil 64, contact members $a$ of speed switch 8, contact members of reversing switch 2, contact members of speed relays 5, 6 and 7 and contact members $b$ of speed relay 8, to line L2.

The generator G now generates its maximum voltage, and the speed of motor M tends to rise to the maximum value. However, the generator iron being now magnetized to a point above the straight portion of its magnetization curve, the ampere turns of the series field winding do not produce as great a change in the flux as they did when the motor was operating at lower speeds. Consequently, the series field winding GSF of the generator is no longer able to maintain the speed of the motor constant, throughout the entire range of load values.

Upon closure of contacts $a$ of speed relay 8, the stationary voltage coil 64 becomes energized in such direction that it attracts the moving coil 65 which is connected across the generator terminals. The coils 64 and 65 are so proportioned that the force between them balances the tension of spring 68 when the generator operates at full voltage and no load. The series coil 70 is wound in such direction that it opposes the flux of coils 64 and 65 when the generator G is supplying power to the motor M and assists the flux of coils 64 and 65 when the motor is supplying power to the generator.

The operation of the relay is, therefore, as follows: if there is no load on the motor, the force due to coils 64 and 65, acting upon each other, balances the force of spring 68 and contact 17 is moved to the neutral position, the balance being achieved when the voltage of generator G reaches the value determined by the short circuiting of resistors R5 through R8. The resistor R1 is, therefore, in series with the generator separately excited field winding GF, and the resistors R2 and R3 are in a series circuit which is in parallel with the separately excited field winding GF, the excitation of winding GF, under these conditions, being such as to provide the desired maximum operating speed of motor M. If the motor M now draws power from the generator G, the flux due to series coil 70 bucks down the flux of stationary voltage coil 64 somewhat, so that the moving contact member 17 engages stationary contact member 18, short circuiting the resistor R1. The generator excitation accordingly increases and, with it, the generator voltage. As the generator voltage builds up, the force between coils 64 and 65 increases until the moving contact member 17 leaves the stationary contact member 18, when the resistor R1 is reinserted in series with the generator separately excited field winding GF, thus reducing the voltage of the generator so that the cycle is repeated. The moving contact member 17 thus vibrates the duration of its engagement with stationary contacts 18 and 19 holding the generator excitation at average value such that the motor speed is maintained at the desired maximum value.

If the load on motor M is overhauling so that the motor returns power to the generator, the flux of series coil 70 assists the flux of coil 64 so that moving contact 17 engages stationary contact 19, short circuiting the resistor R2, thereby reducing the generator voltage. As the generator voltage decreases, the force between coils 64 and 65 decreases until the moving contact 17 leaves the stationary contact 19, thus reinserting resistor R2 and increasing the generator voltage. The moving contact thus vibrates as with motoring loads, the duration of its engagements with contacts 18 and 19 holding the generator excitation at such value that the speed of the motor is constant.

While the series field GSF is connected during high-speed operation, the speed regulation is determined entirely by the voltages and currents existing in the coils of relay R. That is to say, the action of relay R overpowers the action of the series field, so that the speed regulation is fixed by the action of relay R, independently of the series field.

It will be understood that the substance of my invention consists in maintaining the speed of the motor of a variable-voltage system constant by operating on the generator separately excited field in accordance with the current and the voltage of the generator. While I prefer to use a relay for accomplishing this purpose, I regard other devices, such as torque motors and exciters, as equivalent to a relay.

I do not wish to be restricted to the specific structural details, arrangement of parts or circuit connections herein set forth, as various modifications thereof may be effected without departing from the spirit and scope of my invention. I desire therefore, that only such limitations shall be imposed as are indicated in the appended claims.

I claim as my invention:

1. In a motor-control system, a generator having an armature, a motor having an armature, a field winding for said generator, means for exciting said motor, electrical connections between said armatures, a relay of the moving-coil type having an armature carrying a moving coil and a moving contact member, said relay also having a stationary coil and a stationary contact member, means for energizing one of said coils in accordance with the current in said connections, means for energizing the other of said coils in accordance with the voltage of said generator, and means comprising said contact members and said field winding for maintaining the speed of said motor constant.

2. In a motor control system, a generator having an armature and a field winding, a motor having an armature, electrical connections between said armatures, and means to control the excitation of said field winding to maintain the speed of said motor substantially constant comprising contact members, a magnetic structure, a first coil for impressing a magnetomotive force on said structure proportional to the current in said connections, a second coil for impressing a magnetomotive force on said structure proportional to the voltage of said generator, said magnetomotive forces being subtractive when said generator is supplying power to said motor, and means effective when the difference between said magnetomotive forces exceeds a predetermined value, to operate said contact members to reduce the excitation of said field winding.

3. In a motor control system, a generator having an armature and a field winding, a motor having an armature, electrical connections between said armatures, and means to control the excitation of said field winding to maintain the speed of said motor substantially constant comprising contact members, a magnetic structure, a first coil for impressing a magnetomotive force on said structure proportional to the current in said connections, a second coil for impressing a magnetomotive force on said structure proportional to the voltage of said generator, said magnetomotive forces being subtractive when said generator is supplying power to said motor, and means effective when the difference between said magnetomotive forces exceeds a predetermined value, to operate said contact members to reduce the excitation of said field winding, and effective when said difference is less than said predetermined value to operate said contact members to increase the excitation of said field winding.

WILLIAM F. EAMES.